(12) United States Patent
Engler

(10) Patent No.: US 6,571,305 B1
(45) Date of Patent: May 27, 2003

(54) SYSTEM FOR EXTENDING LENGTH OF A CONNECTION TO A USB PERIPHERAL

(75) Inventor: Michael G. Engler, Stamford, CT (US)

(73) Assignee: Lantronix, Inc., Irvine, CA (US)

(*) Notice: Subject to any disclaimer, the term of this patent is extended or adjusted under 35 U.S.C. 154(b) by 477 days.

(21) Appl. No.: 09/670,790

(22) Filed: Sep. 27, 2000

(51) Int. Cl.⁷ .............................................. G06F 13/00
(52) U.S. Cl. ..................................... 710/100; 710/300
(58) Field of Search .................................. 710/100, 300, 710/305, 313, 106; 703/23, 24, 25, 27

(56) References Cited

U.S. PATENT DOCUMENTS

| | | | | |
|---|---|---|---|---|
| 5,884,066 A | * | 3/1999 | Kuijsten | 703/28 |
| 6,067,589 A | * | 5/2000 | Mamata | 710/63 |
| 6,266,715 B1 | * | 7/2001 | Loyer et al. | 710/22 |
| 6,308,215 B1 | * | 10/2001 | Kolbet et al. | 709/233 |
| 6,393,588 B1 | * | 5/2002 | Hsu et al. | 714/43 |
| 6,446,867 B1 | * | 9/2002 | Sanchez | 235/454 |
| 6,526,468 B1 | * | 2/2003 | Larochelle et al. | 710/305 |

* cited by examiner

Primary Examiner—Sumati Lefkowitz
Assistant Examiner—X. Chung-Trans
(74) Attorney, Agent, or Firm—Stetina Brunda Garred & Brucker

(57) ABSTRACT

A system for extending in length a connection from a universal serial bus (USB) peripheral device to a computer beyond the length enabled by the device hardware. The system includes: a USB host emulator, for polling the USB peripheral device according to a USB standard protocol, for receiving input provided by the USB peripheral device in response to the polling, for providing the input in a form suitable for transmission via a communications channel, such as serialized form for transmission via a copper or spread spectrum form for communication as a radiofrequency signal; the communications channel, having an input end and an output end, responsive to the input at the input end, for providing the input at the output end; a USB device emulator, responsive to the input at the output end of the communications channel, and further responsive to polling from the computer, and in response to the polling, for reforming the input into USB format and providing the USB formatted input to the computer according to a USB protocol.

5 Claims, 3 Drawing Sheets

SYSTEM FOR EXTENDING LENGTH OF A CONNECTION TO A USB PERIPHERAL

FIELD OF THE INVENTION

The present invention pertains to the field of hardware for connecting devices, such as a mouse and a keyboard, to a computer, and in particular, to extender hardware (including intelligent systems) to be used in combination with the device connection hardware for providing for connections of such devices over substantially greater distances than the device connection hardware allows by itself.

BACKGROUND OF THE INVENTION

In order to allow for easier connection to a personal computer (PC) of input/output devices, such as a mouse and a keyboard, a standard has been developed to replace the existing so-called Personal System 2 (PS2) standard for such devices. The new standard is called universal serial bus (USB), and its latest version (2.0) sets out how not only low speed devices such as a mouse or keyboard are to be connected, but also how high speed devices such as a digital camera or a scanner are to be connected. USB allows expandability of a PC's capabilities via an external port, eliminating the need for users or integrators to open the system chassis of the PC. USB supports multiple peripheral devices simultaneously, so it allows users to run numerous devices such as printers, scanners, digital cameras and speakers from a single PC. USB also provides for automatic device detection and installation (i.e. plug-and-play).

In providing a specification that would make connection of a device easier (via plug-and-play) and at the same time providing for a connection that is up to 100 times faster than the original serial port and supports multiple device connectivity, tradeoffs had to be made. One tradeoff is in the maximum allowed length of the connector used to connect a peripheral device to a computer; the cable for a USB peripheral device cannot be greater than 5 meters, although it is possible to connect to a computer up to thirty meters away using for example a series of so-called hub devices or driving the connection at a higher-than-designed-for voltage.

In some applications, it is advantageous to connect a peripheral device, such as a mouse or keyboard, to a computer over distances of up to 10,000 feet. It is not possible to make such a connection using a series of hubs (because USB hub hardware makes possible a connection of only up to thirty meters even using hubs), nor does the prior art generally teach how to make a USB connection over such long distances.

What is needed is a way of extending a connection from a USB peripheral device, or at least a low-speed USB peripheral device such as a mouse or a keyboard, to distances of up to 10,000 feet.

SUMMARY OF THE INVENTION

Accordingly, the present invention provides a system for extending in length a connection from a universal serial bus (USB) peripheral device to a computer beyond the length enabled by the device hardware, the system including: a USB host emulator, for polling the USB peripheral device according to a USB standard protocol, for receiving input provided by the USB peripheral device in response to the polling, for providing the input in a form suitable for transmission via a communications channel, such as serialized form for transmission via a copper or spread spectrum form for communication as a radiofrequency signal; the communications channel, having an input end and an output end, responsive to the input at the input end, for providing the input at the output end; a USB device emulator, responsive to the input at the output end of the communications channel, and further responsive to polling from the computer, and in response to the polling, for reforming the input into USB format and providing the USB formatted input to the computer according to a USB protocol.

In a further aspect of the invention, the USB host emulator includes: a USB transceiver, for bi-directionally coupling a glue logic module to the USB peripheral device so as to allow polling the USB peripheral device and to allow receiving a report packet provided by the USB peripheral device in response to the polling, the USB transceiver for providing physical interfacing, according to a USB standard, of the attached USB device to the glue logic module; the glue logic module, such as a field programmable gate array, for interfacing the USB transceiver to a control processor; a control processor, for polling the USB peripheral device and for receiving a report packet provided by the USB peripheral device in response to the polling, and further for providing the report packet information in serialized form; a serial peripheral interface (SPI) universal asynchronous receiver/transmitter (UART), serving as a bus for serial data transmission, for applying the serialized report packet information to a communications port; and the communications port, for applying the serialized report packet information received from the SPI UART to the communications channel.

In another, further aspect of the invention, the USB device emulator includes: a communications port, for receiving the serialized report packet information received from the SPI UART to the communications channel; a serial peripheral interface (SPI) universal asynchronous receiver/transmitter (UART), serving as a bus for serial data transmission, for communicating the serialized report packet information to a control processor; the control processor, for receiving and storing the serialized report packet information, responsive to polling from the host computer, for providing the report packet information in packetized format in response to the polling; the glue logic module, such as a field programmable gate array, for interfacing the control processor to a USB transceiver; and the USB transceiver, for bi-directionally coupling the glue logic module to the host computer so as to allow polling of the USB peripheral device and to allow providing a report packet provided by the USB peripheral device in response to the polling, the USB transceiver for providing physical interfacing, according to a USB standard, of the host computer to the glue logic module.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
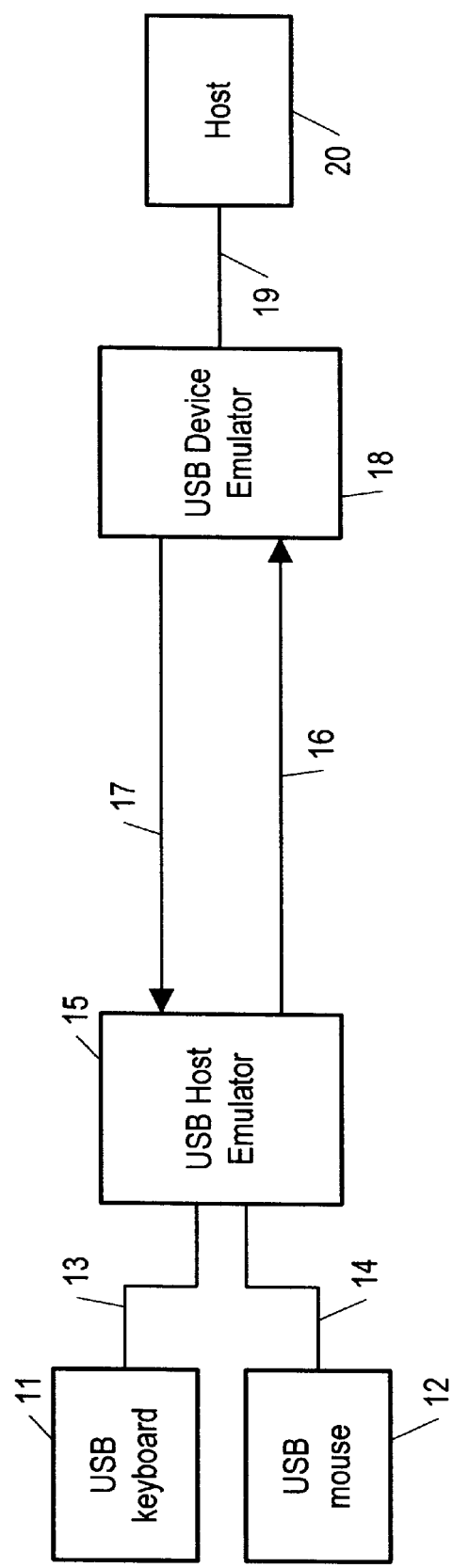
FIG. 1 is a block diagram showing a system according to the present invention for extending the length of a connecting to two USB devices, a USB mouse and a USB keyboard, the system including a USB host emulator component and a USB device emulator component.

Referring now to FIG. 1, a system for extending in length a connection to a peripheral device according to a universal serial bus (USB) standard is shown as including a USB host emulator 15 connected to a USB confined peripheral such as a USB keyboard 11 or a USB mouse 12, and a USB device emulator 18 connected to a host 20 such as a personal computer (PC) or a sun work station. The USB host emulator 15 responds to each attached USB peripheral 11 12 according to a USB standard. Each USB peripheral device 11 12 is connected to the USB host emulator 15 via a USB cable 13 14. According to the USB standard, a USB host polls attached USB peripherals and, in response, each polled USB peripheral responds with a report packet communicating for example input from a user. The cable 13 connecting the USB keyboard 11 to the USB host emulator 15, and the cable 14 connecting the USB mouse 12 to the USB host emulator 15 has a maximum length of approximately 5 meters when provided according to a USB standard. According to the present invention, the USB host emulator communicates to the USB device emulator 18 over a communications channel 16 not provided according to a USB standard the report packets it receives from the attached peripherals 11 12; the communications channel may be implemented as a wireless communication channel, a copper wire, or an optical fiber, and may be up to for example 10,000 feet. In communicating the report packets to the USB device emulator 18, the USB host emulator 15 serializes the packets for transmission over the communications channel 16 to the USB device emulator, or otherwise prepares the packets for transmission via the communications channel 16 such as by formatting the packets as a spread spectrum signal for transmission as one form of radiofrequency (RF) signal. The device emulator 18 emulates a USB peripheral, such as a USB keyboard or a USB mouse, and is compatible with both USB host and hub communications, and, in response to receiving a serialized report packet from the USB host emulator 15, the USB device emulator 18 calculates a check sum of the transmitted serialized report packet and, in case of an error, signals the USB host emulator 15 via a return communications channel 17. The USB device emulator 18 stores each serialized report packet it receives from the USB host emulator 15 until it is polled by the host 20. In the preferred embodiment, the USB device emulator 18 emulates a human interface device (HID) compatible USB keyboard and HID compatible mouse, communicating to the host 20 the report packets originally prepared by the actual USB peripheral devices 11 12 via a standard USB connection 19.

Figure 2:
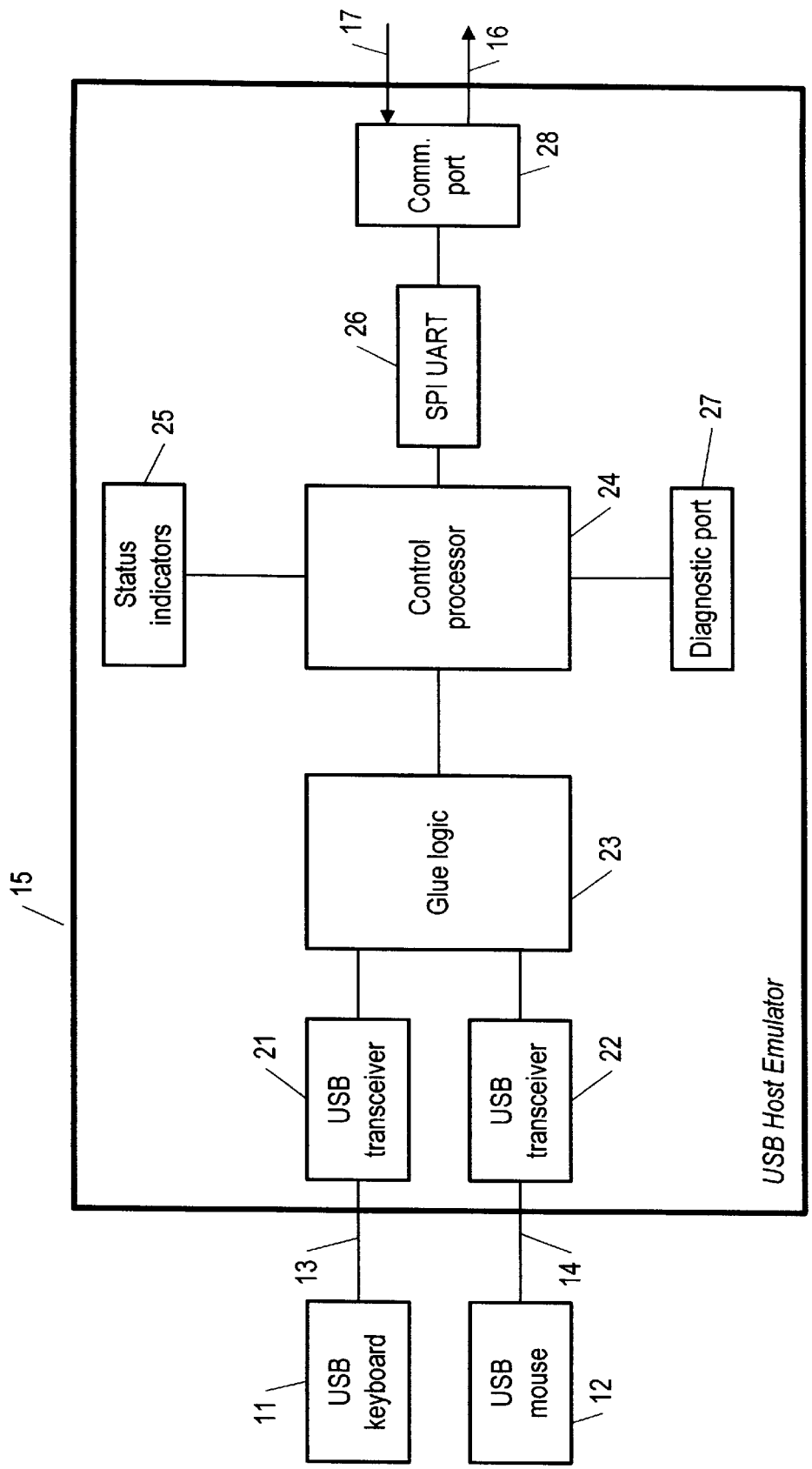
FIG. 2 is a more detailed block diagram of the USB host emulator component of the system of the present invention.

Referring now to FIG. 2, the USB host emulator 15 is shown in more detail as including one USB transceiver 21 22 for each attached peripheral device 11 12. Each USB transceiver 21 22 provides all physical USB interfacing to the attached USB peripheral device 11 12. A USB transceiver 21 22 in the preferred embodiment is a host/slave microprocessor chip such as the SL811HS host/slave controller provided by ScanLogic Corporation, a dual-speed USB host/slave controller for use in non-PC devices. A glue logic module 23 provides low level logical interfacing to all attached peripheral devices 11 12, complementing the physical interfacing provided by the USB transceivers 21 22. The glue logic module is more specifically a field programmable gate array. The glue logic module provides in particular timing interfacing between a control processor 24 and the USB transceivers 21 22. The control processor 24 is programmed to poll the attached USB peripheral devices according to a USB standard (such as for example USB standard version 1.1 or USB standard version 2.0). The control processor 24 receives report packets from the attached peripheral devices in response to its polling of the peripherals and stores the report packets until they are successfully communicated to the USB device emulator 18; in other words, the control processor 24 waits until it receives a confirmation from the USB device emulator 18 that the report packets have arrived with correct checksums. To provide the report packets to the USB device emulator, the control processor 24 serializes the report packet and provides them through a serial peripheral interface (SPI) universal asynchronous receiver/transmitter 26 to a communication port 28 leading to a communication channel 16 between the USB host emulator 15 and the USB device emulator 18. In case of a failed checksum, the USB device emulator 18 signals the USB host emulator 15 over the return communication channel 17. The USB host emulator 15 also includes a status indicator 25 coupled to the control processor 24 so as to signal to a user the status of the control processor, such as for example whether the control processor is receiver or transmitting. In addition, a diagnostic port 27 for the control processor is provided to enable collecting information on the performance and processing of the control processor 24.

Figure 3:
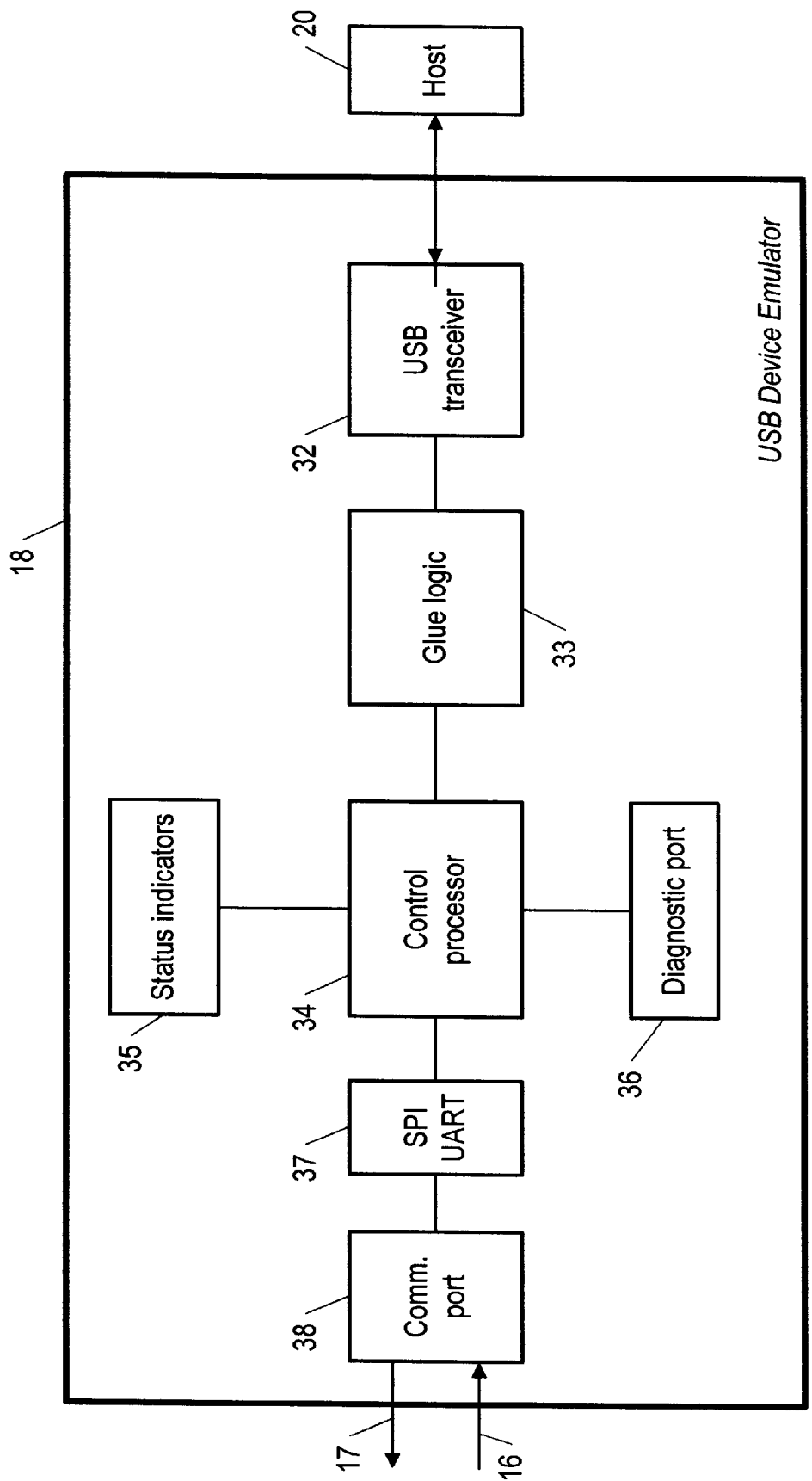
FIG. 3 is a more detailed block diagram of the USB device emulator component.

Referring now to FIG. 3, the USB device emulator 18 is shown in more detail as including several modules corresponding to modules of the USB host emulator 15. The USB device emulator is essentially a mirror image of the USB host emulator. However, the control processor 34 of the device emulator is programmed to act as a USB device, instead of a USB host (as in the USB host emulator) and so responds to polling from the host 20 with report packets it receives in serialized form over the communication channel 16 from the USB host emulator. The device emulator includes a communication port 38 to which the communication channel 16 from the USB host emulator and the communication channel 17 leading to the USB host emulator are connected, an SPI UART 37 interfacing the control processor to the communication port 38, a glue logic module 33 providing logical interfacing of the control processor 34 to a USB transceiver 32, the USB transceiver in turn providing the physical interfacing between a USB port 31 and the glue logic module 33. In addition, just as in the case of the USB host emulator, the device emulator includes a status indicator 35 for indicating to the user the status of the control processor 34, and also includes a diagnostic port 36 allowing access by a user to information about the performance and operation of the control processor 34.

In the preferred embodiment, both the USB host emulator 15 and the USB device emulator 18 are each provided in their own protective container in such a way that the status indicators 25 35 are visible to a user, but the diagnostic ports 27 36 cannot be accessed without opening the protective containers.

The USB device emulator is capable of operating standalone in case of a communication failure while it is communicating with the USB host emulator. The USB device emulator satisfies all PC host boot up requirements, allowing normal operation and boot up without first establishing communications with the USB host emulator. When a connection is established, normal operation begins. On the USB host emulator side, status indicator lights of the USB keyboard flash continuously, alerting the user, until communications is established.

It is to be understood that the above-described arrangements are only illustrative of the application of the principles of the present invention. In particular, the present invention is intended to comprehend a USB host emulator and a USB device emulator with sufficient computing resources to allow extending the length of a connection not only for low-speed devices such as a mouse or a keyboard, but also for high-speed devices such as a scanner; all that is required is to use a USB device emulator and a USB host emulator with greater processing power compared to what is satisfactory for connecting a low-speed device. Numerous other modifications and alternative arrangements from what is disclosed here may be devised by those skilled in the art without departing from the spirit and scope of the present invention, and the appended claims are intended to cover such modifications and arrangements.

What is claimed is:

1. A system for extending in length a connection from a universal serial bus (USB) peripheral device to a computer beyond the length enabled by the device hardware, the system comprising:
    a) a USB host emulator, for polling the USB peripheral device according to a USB standard protocol, for receiving input provided by the USB peripheral device in response to the polling, for providing the input in a form suitable for transmission via a communications channel, wherein the USB host emulator further comprises: a USB transceiver, for bi-directional coupling a glue logic module to the USB peripheral device and to allow receiving a report packet provided by the USB peripheral device in response to the polling, the USB transceiver for providing physical interfacing, according to a USB standard, of the attached USB device to the glue logic module;
    b) the communications channel, having an input end and an output end, responsive to the input at the input end, for providing the input at the output end;
    c) a USB device emulator, responsive to the input at the output end of the communications channel, and further responsive to polling from the computer, and in response to the polling, for reforming the input into USB format and providing the USB formatted input to the computer according to a USB protocol.

2. A system as in claim 1, wherein the USB host emulator further comprises:
    a) the glue logic module, such as a field programmable gate array, for interfacing the USB transceiver to a control processor;
    b) a control processor, for polling the USB peripheral device and for receiving a report packet provided by the USB peripheral device in response to the polling, and further for providing the report packet information in serialized form;
    c) a serial peripheral interface (SPI) universal asynchronous receiver/transmitter (UART), serving as a bus for serial data transmission, for applying the serialized report packet information to a communications port; and
    d) the communications port, for applying the serialized report packet information received from the SPI UART to the communications channel.

3. A system as in claim 1, wherein the USB device emulator further comprises:
    a) a communications port, for receiving the serialized report packet information received from the SPI UART to the communications channel;
    b) a serial peripheral interface (SPI) universal asynchronous receiver/transmitter (UART), serving as a bus for serial data transmission, for communicating the serialized report packet information to a control processor;
    c) the control processor, for receiving and storing the serialized report packet information, responsive to polling from the host computer, for providing the report packet information in packetized format in response to the polling;
    d) the glue logic module, such as a field programmable gate array, for interfacing the control processor to a USB transceiver; and
    e) the USB transceiver, for bi-directionally coupling the glue logic module to the host computer so as to allow polling of the USB peripheral device and to allow providing a report packet provided by the USB peripheral device in response to the polling, the USB transceiver for providing physical interfacing, according to a USB standard, of the host computer to the glue logic module.

4. A system as in claim 1, wherein the form suitable for transmission via the communications channel is a serialized form.

5. A system as in claim 1, wherein the form suitable for transmission via the communications channel is a form used for radiofrequency communications, such as a spread spectrum form.

* * * * *